Mar. 13, 1923. 1,448,442
F. W. HENSKEY
SHEET DOUBLING MACHINE
Filed Aug. 9, 1921 14 sheets-sheet 1

INVENTOR
F.W. Henskey.
BY
Fred G. Dieterich
ATTORNEYS

Mar. 13, 1923.

F. W. HENSKEY

SHEET DOUBLING MACHINE

Filed Aug. 9, 1921

INVENTOR
*F. W. Henskey.*
BY
*Fred G. Dieterich & Co*
ATTORNEYS

Mar. 13, 1923.

F. W. HENSKEY 1,448,442

SHEET DOUBLING MACHINE

Filed Aug. 9, 1921

INVENTOR

F. W. Henskey.

BY
Fred G. Dieterich
ATTORNEYS

Mar. 13, 1923.
F. W. HENSKEY
SHEET DOUBLING MACHINE
Filed Aug. 9, 1921
1,448,442
14 sheets-sheet 10
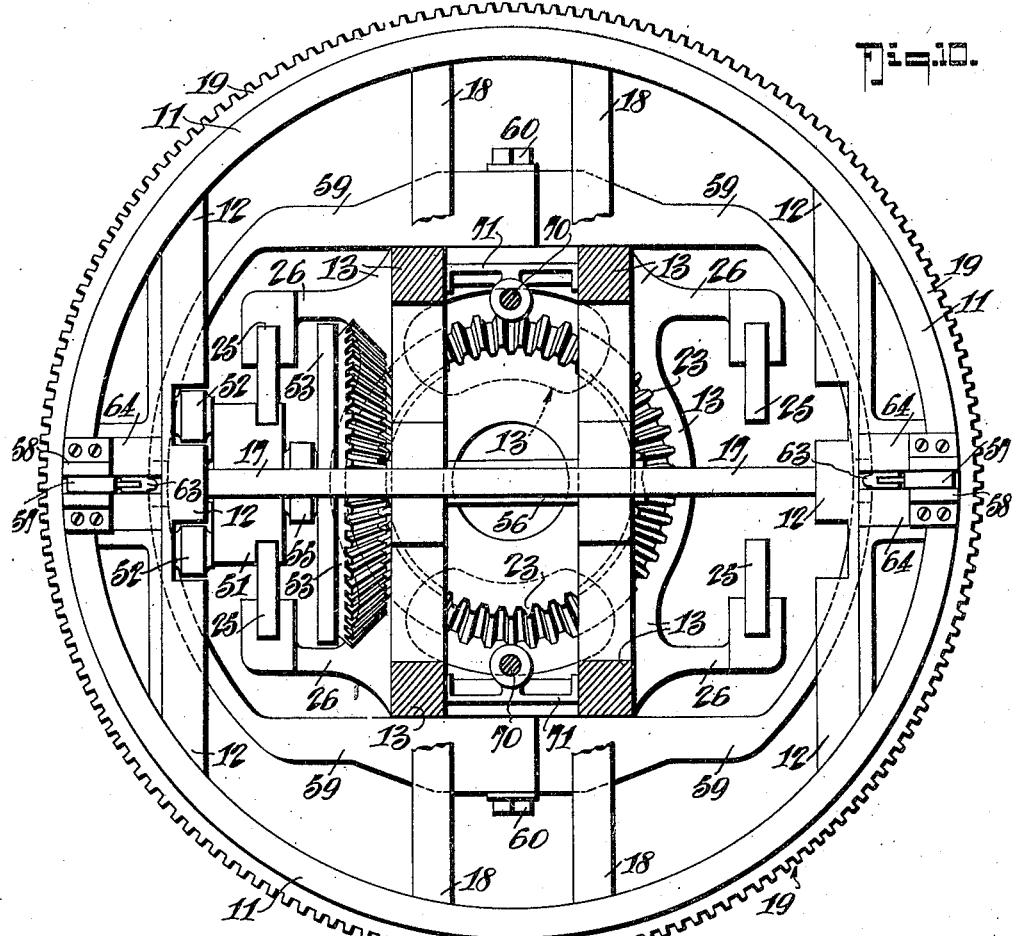
Fig.10.
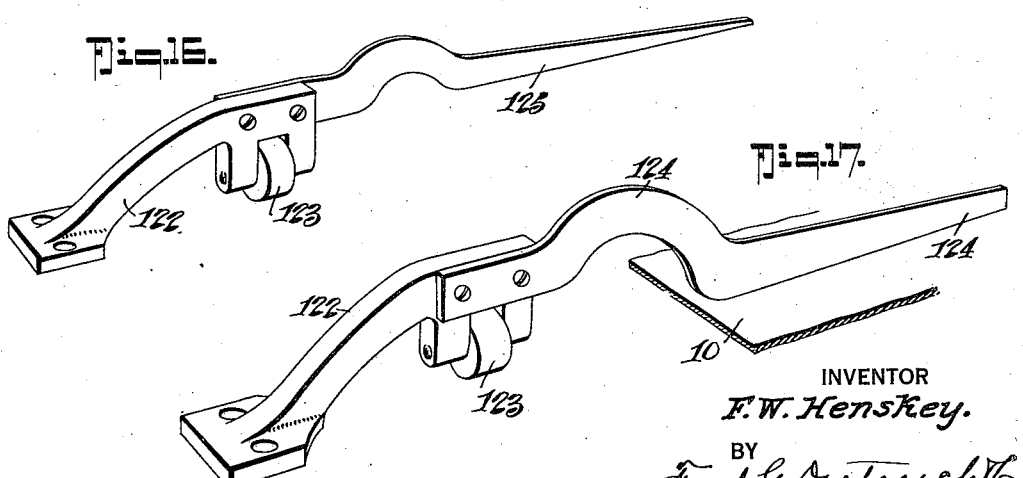
Fig.16.
Fig.17.
INVENTOR
F. W. Henskey.
BY
Fred G. Dieterich
ATTORNEYS

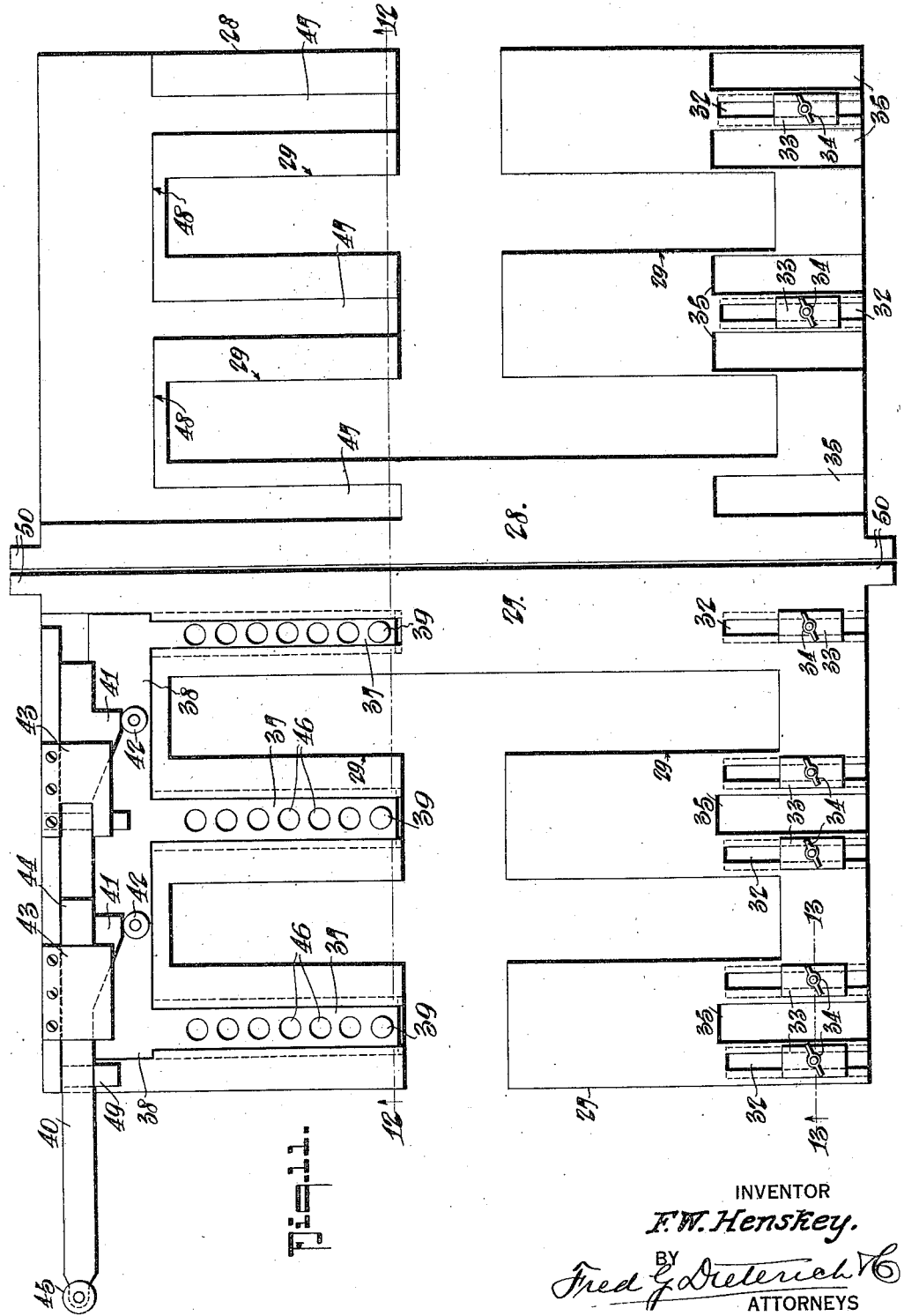

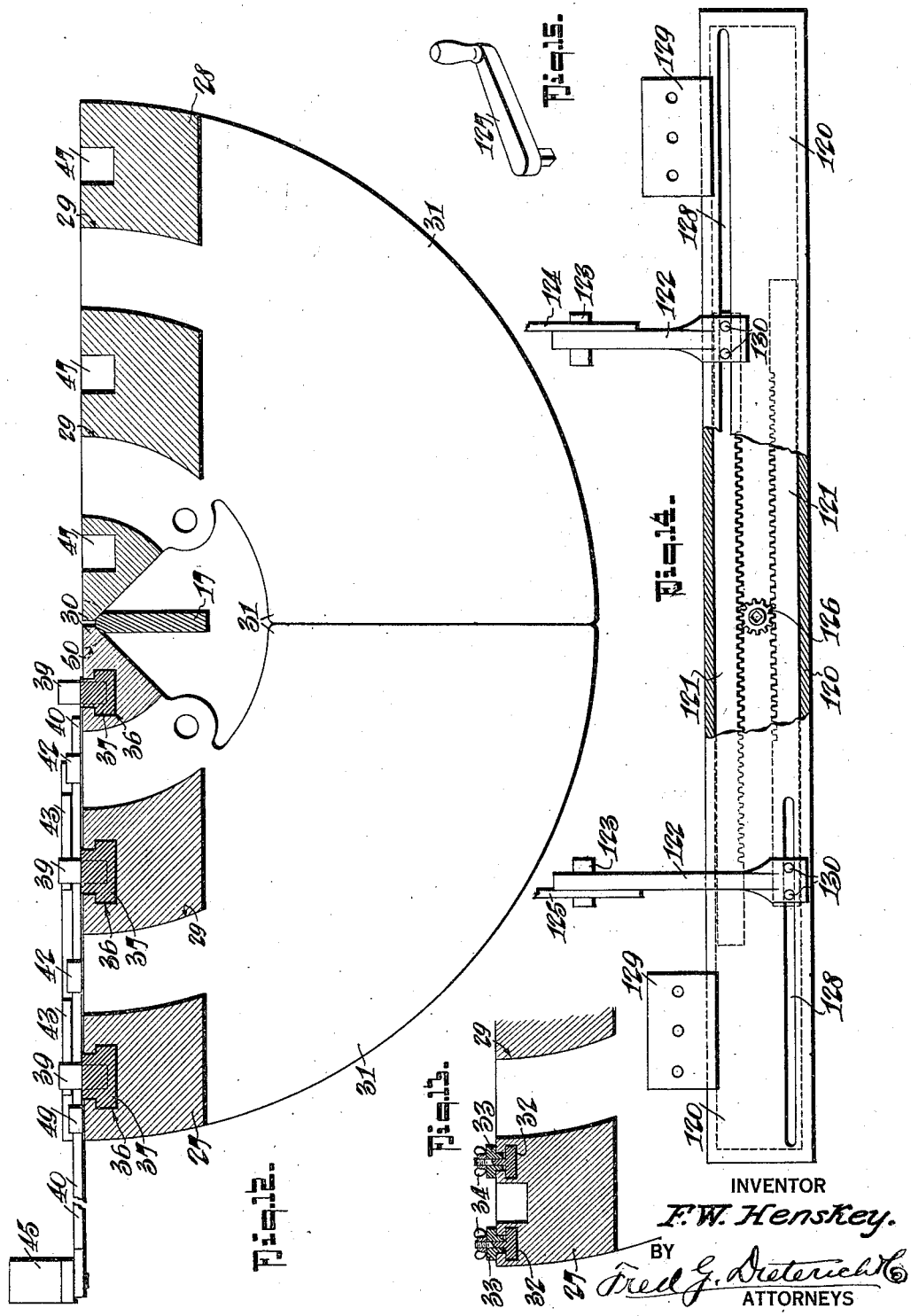

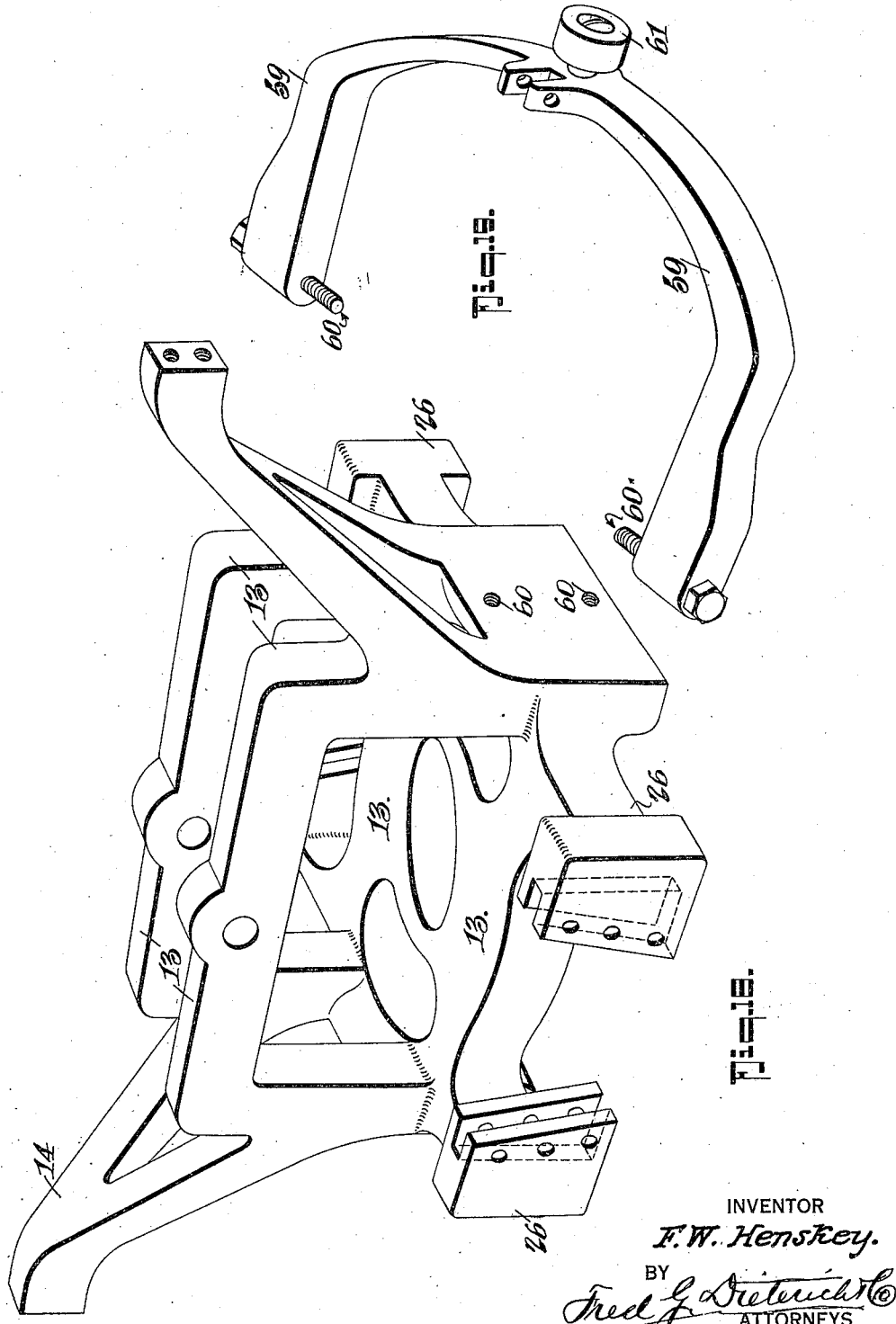

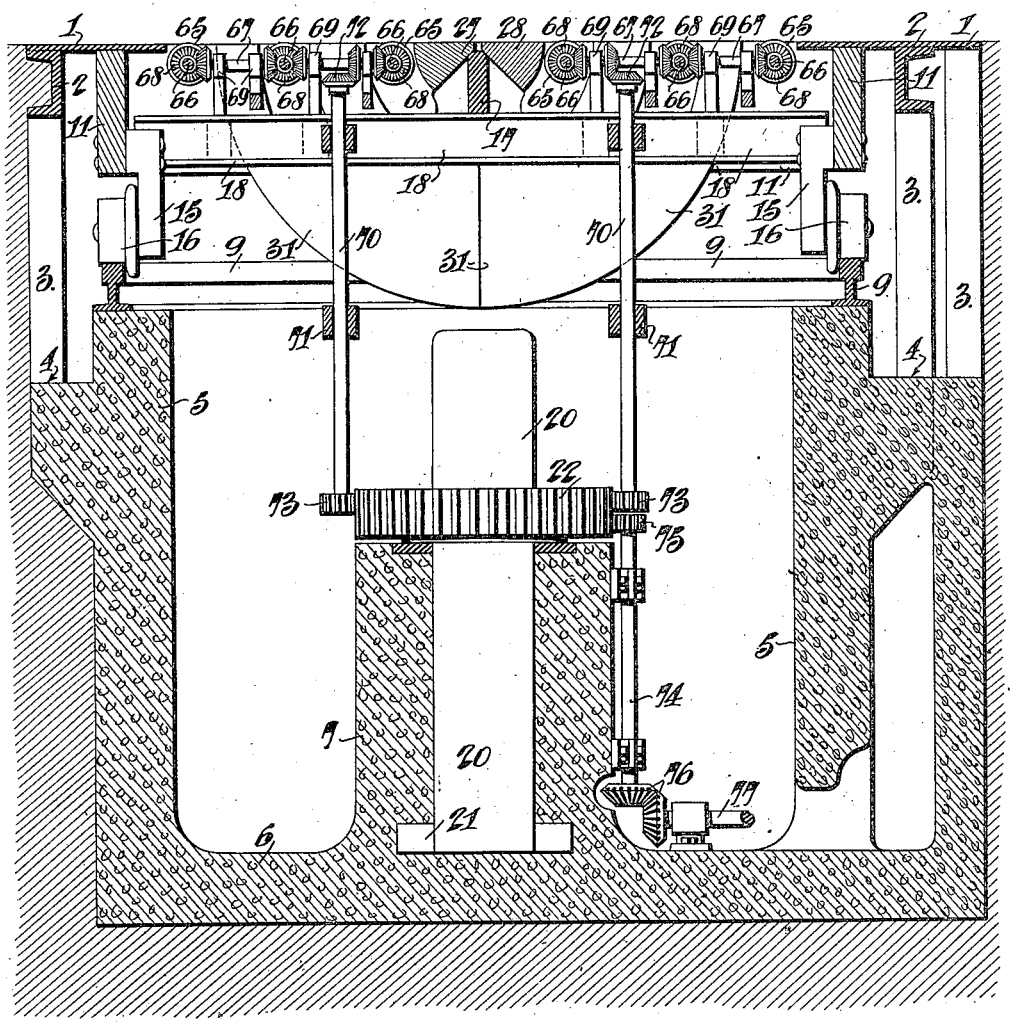

Patented Mar. 13, 1923.

1,448,442

UNITED STATES PATENT OFFICE.

FREDERICK WILLIAM HENSKEY, OF McKEESPORT, PENNSYLVANIA, ASSIGNOR TO THE SHEET AND TIN PLATE DOUBLING MACHINE COMPANY, OF McKEESPORT, PENNSYLVANIA, A CORPORATION OF DELAWARE.

SHEET-DOUBLING MACHINE.

Application filed August 9, 1921. Serial No. 490,988.

*To all whom it may concern:*

Be it known that I, FREDERICK W. HENSKEY, a citizen of the United States, residing at McKeesport, in the county of Allegheny and State of Pennsylvania, have invented a new and Improved Sheet-Doubling Machine, of which the following is a specification.

My invention which, in general, relates to that class of machinery designed for doubling or folding sheets, has special reference, however, to machines for doubling sheets or packs of tin plate or other metal.

When the rolls of the mill are working properly, the sheets come from the rolls with one of their ends square across and the other concaved, while when the rolls are working full, the pack comes out with the scrap end convexed.

In bending the sheets, it is the object to so fold the same as to leave as little scrap or waste, to cut off, as possible.

Heretofore in folding tin plate, the overall length of the plate determined the bending place (curled end as it is called after bending) therefore requiring that a cut be taken which will not only shear off the scrap end but also so much of the square end as lies on top of the scrap end.

It is therefore one of the objects of my invention to provide means for so positioning the pack on the folding table that the place of fold or bend will be so located that the square end, when folded over on the scrap end, will come to such position that it will lie tangent to the curve of the concaved scrap end or along the chord of the arc of the convexed scrap end accordingly as the plate is one which came from properly working or full working rolls, thereby making it necessary to shear off only the scrap ends and reducing the wastage to the minimum.

Another object of my invention is so to handle the pack that it comes onto the table from the rolls in a direction at right angles to that at which it passes to the shears and at which it leaves the machine to pass to the heater.

The invention further has for its objects to provide a machine in which the turntable moves in one direction only, stopping automatically in its course at the three-quarter and full revolution station, the table being set in motion by means under control of the attendant; to provide means for edging and gripping the pack so that it will remain on one certain bending plate during the bending operation and until the bending plates are restored to their normal position, when the pack is automatically released to enable it to be fed to the shears; to provide automatically actuated means for releasing or unlocking the grippers at proper intervals to release the pack; to provide automatically actuated breakers that hold the pack down at the place of fold while the folding plates or leaves close to a predetermined angle, at which time the breakers are automatically withdrawn therefrom before the fold is completed; to provide mechanism of strong compact construction, the parts of which may be readily replaced or repaired in case of accident; and to provide a mechanism which will effectually serve its intended purposes.

In the drawings in which I have illustrated a preferred embodiment of my invention—

Figure 10 is a detail plan view of the rotatable table, the cover plate and the bending plates being removed and other parts being in section for the purpose of more clearly illustrating the parts shown.

Figure 11 is a detail plan view of the bending plates per se.

Figure 12 is a detail cross section thereof on the line 12—12, on Fig. 11, the rest member for said plates being also shown.

Figure 13 is a detail cross section taken on the line 13—13 on Figure 11.

Figure 14 is a detail plan view of the tin pack centering mechanism per se, parts being broken away.

Figure 15 is a detail perspective view of the operating crank for the said centering mechanism.

Figures 16 and 17 are detail perspective views of the centering arms of the centering mechanism.

Figure 18 is a detail perspective view of the main casting per se.

Figure 19 is a similar view of one of the pivoted yoke levers which effect the raising and lowering of the breaker members.

Figure 20 is a diagrammatical development of one of the cam tracks which regulate the raising and lowering of the said breaker members.

Figure 21 is a somewhat diagrammatic cross section of the machine and illustrates the passing rollers driving mechanism, parts being omitted for the purpose of more clearly illustrating the parts shown.

Figures 22 and 23 are detail views illustrating single sheets of tin, one from properly working rolls and one from full working rolls, and illustrating the manner in which the fold and cut is made on each in such manner as to minimize the waste.

Figure 1:
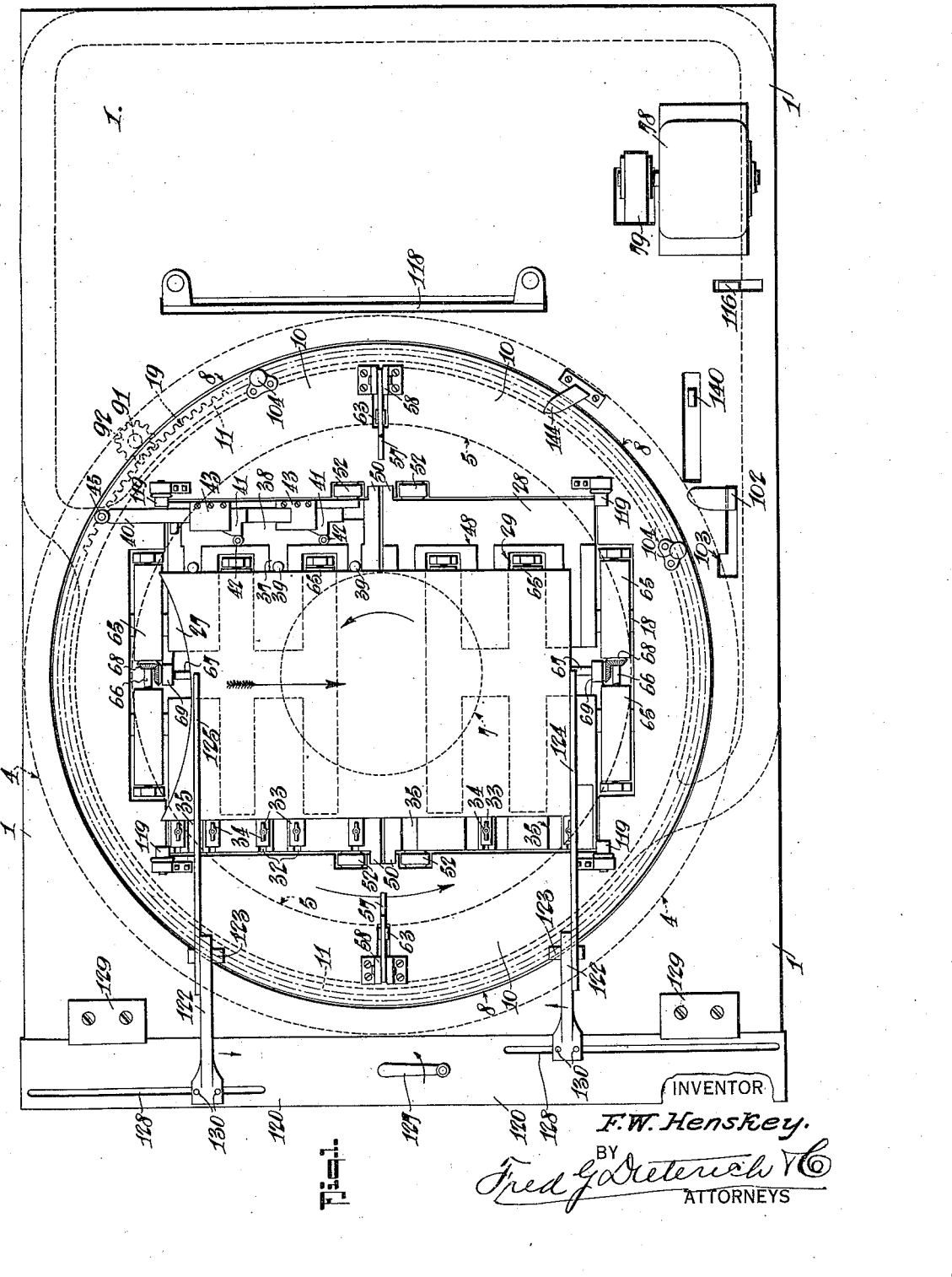
Figure 1 is a top plan view of the invention with a tin pack in place centered by the centering gauge and gripped by the gripping mechanism.

In the embodiment of my invention shown in the accompanying drawings, in which drawings like numerals of reference indicate like parts in all of the figures, 1 represents the top platform which is supported on channel irons 2 flush with the ground level. The channel irons 2 are sustained by standards 3 mounted on the ledge 4 of the masonry pit 5. The pit 5 has its bottom 6 provided with a central elevation 7 in which at 21 is anchored the stub shaft or post 20.

The platform, 1, which is laid flush with the floor level, has a circular opening 8 for the turn-table 10, the top of which lies flush with the platform and is carried on a frame composed of a ring 11 that is braced by channel irons 12 and 18, and a casting 13 whose arms 14 are secured to the ring 11 and which has a bearing around the post 20.

The weight of the turn-table frame and the parts carried thereby is sustained by brackets 15 with flanged wheels 16 that ride on a circular track 9 on the top of the wall 5 of the pit.

Figure 5:
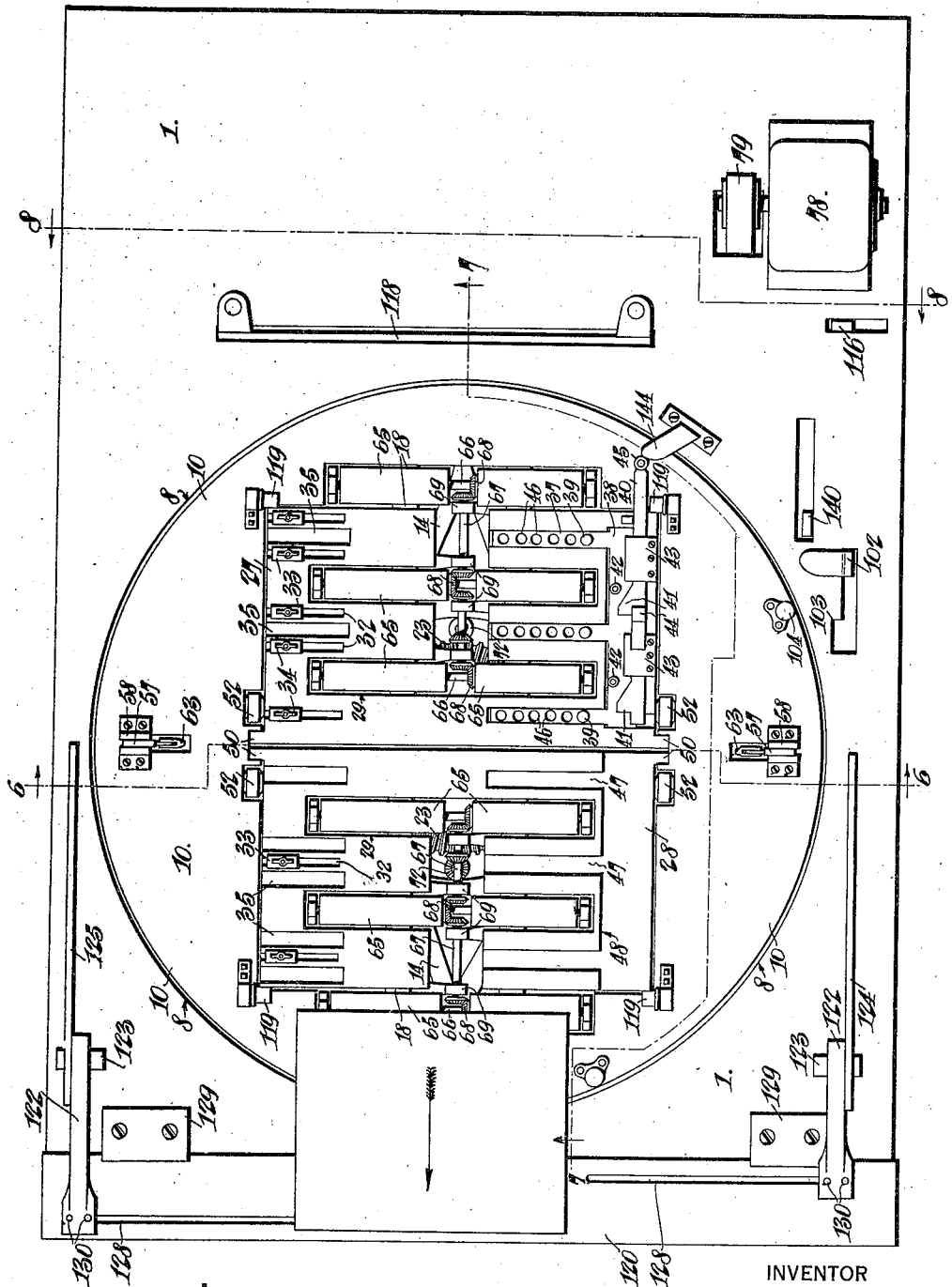
Figure 5 is a top plan view showing the table in like position, the tin pack having been trimmed of waste and being removed from the table by the passing rollers, rotating in reverse direction.
Figure 6:
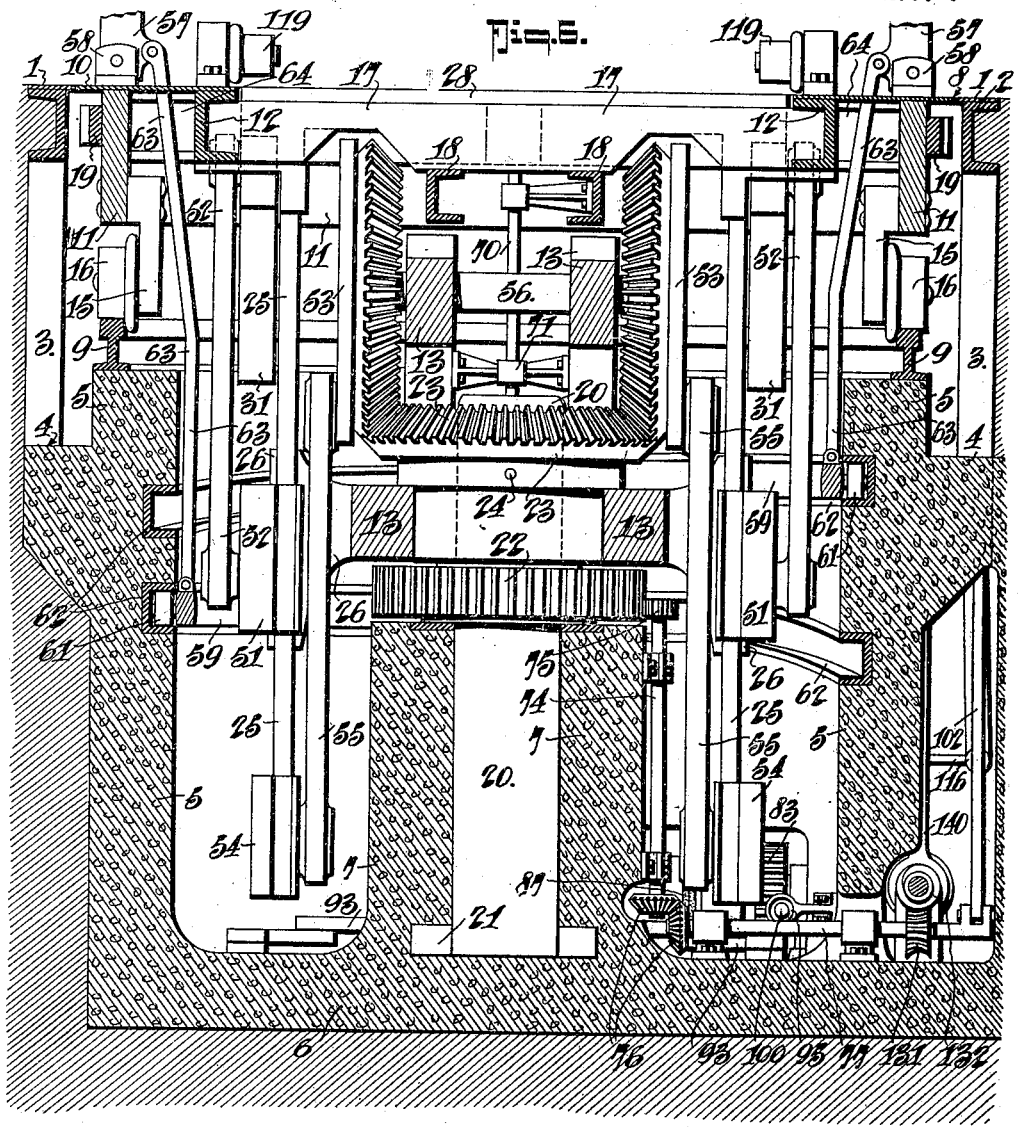
Figure 6 is a vertical cross section taken substantially on the line 6—6 on Figure 5.
Figure 7:
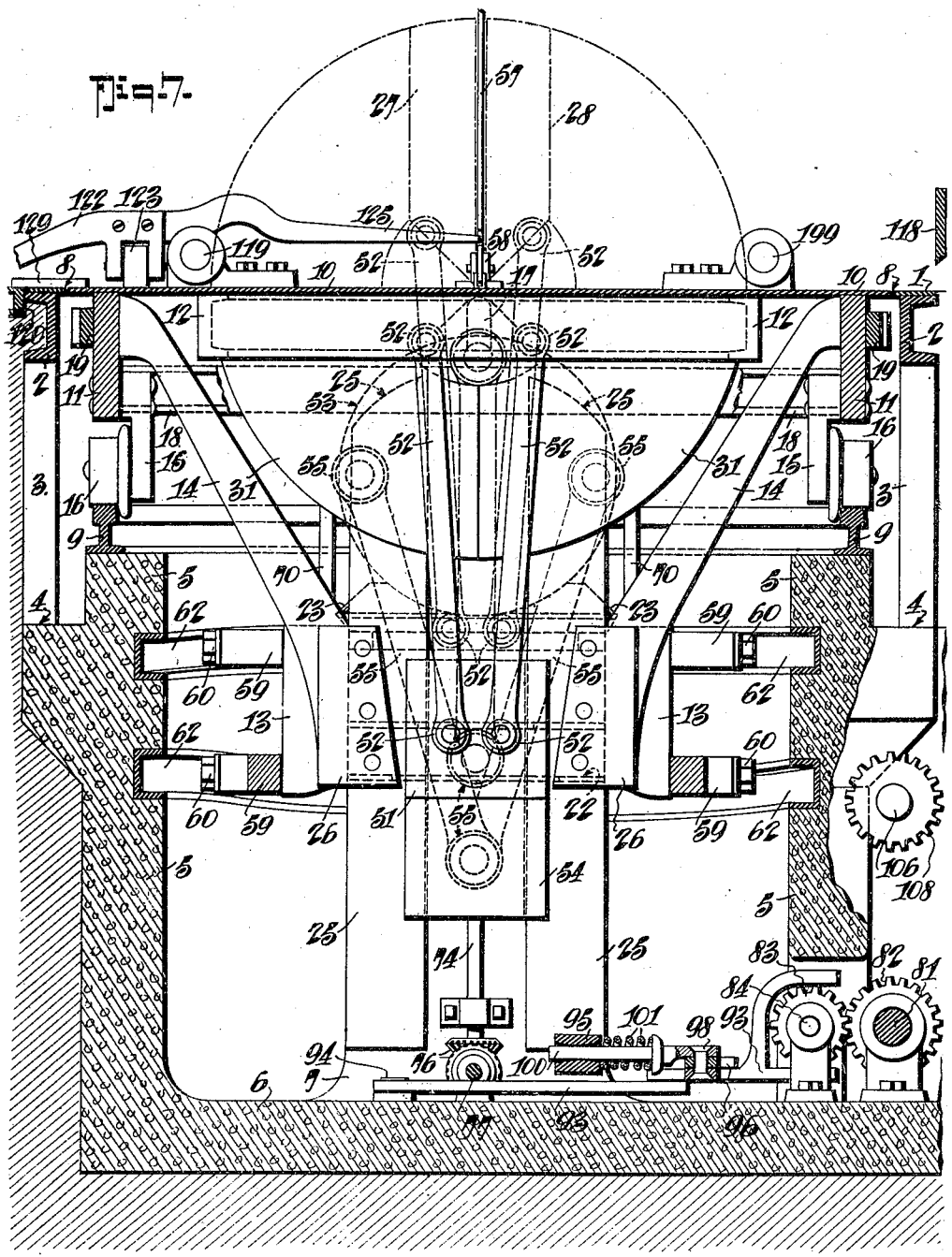
Figure 7 is a vertical longitudinal section of a portion of the machine and which is taken substantially on the line 7—7 on Figure 5, parts being shown in elevation.
Figure 8:
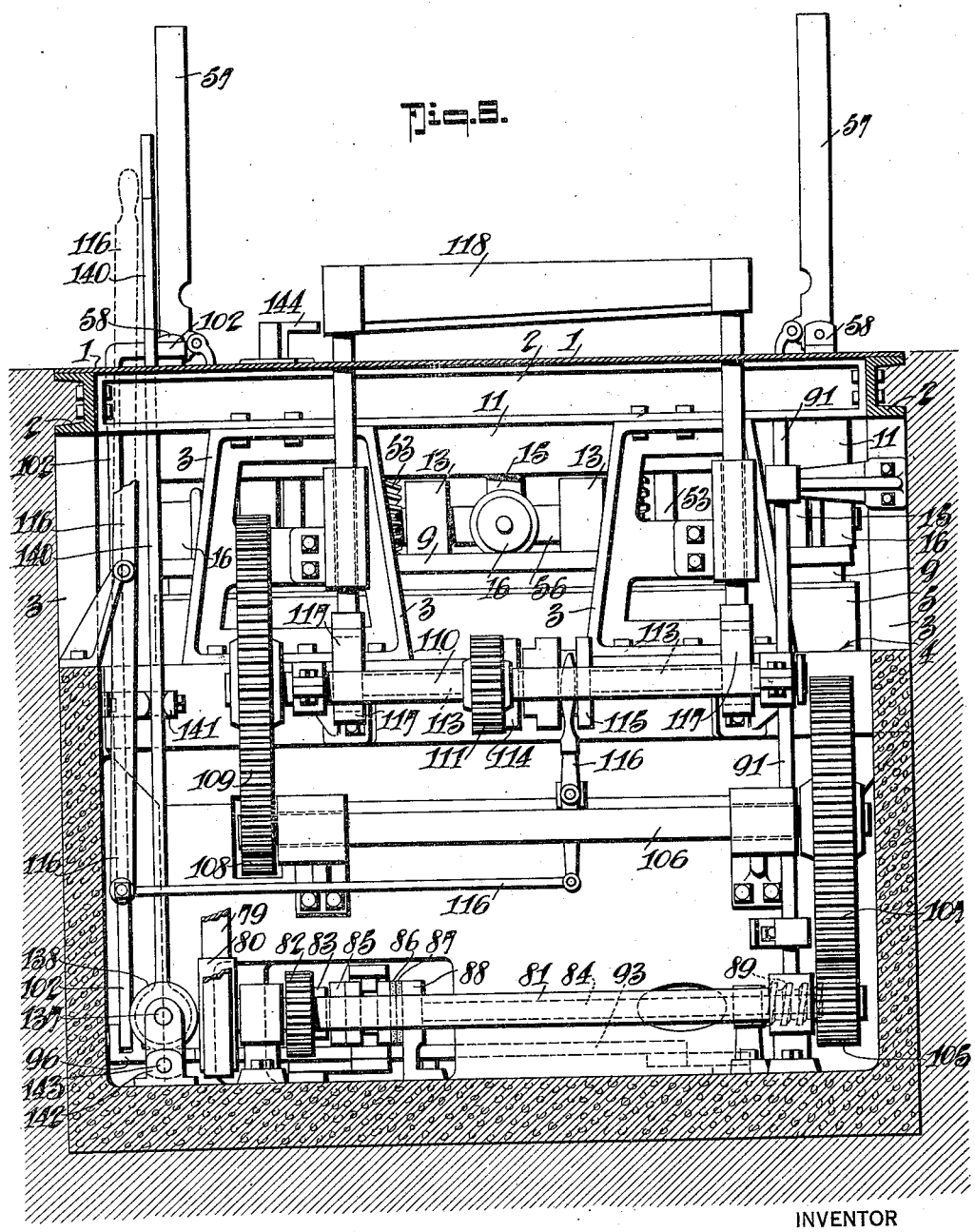
Figure 8 is a vertical cross section taken on the line 8—8 on Figure 5.
Figure 9:
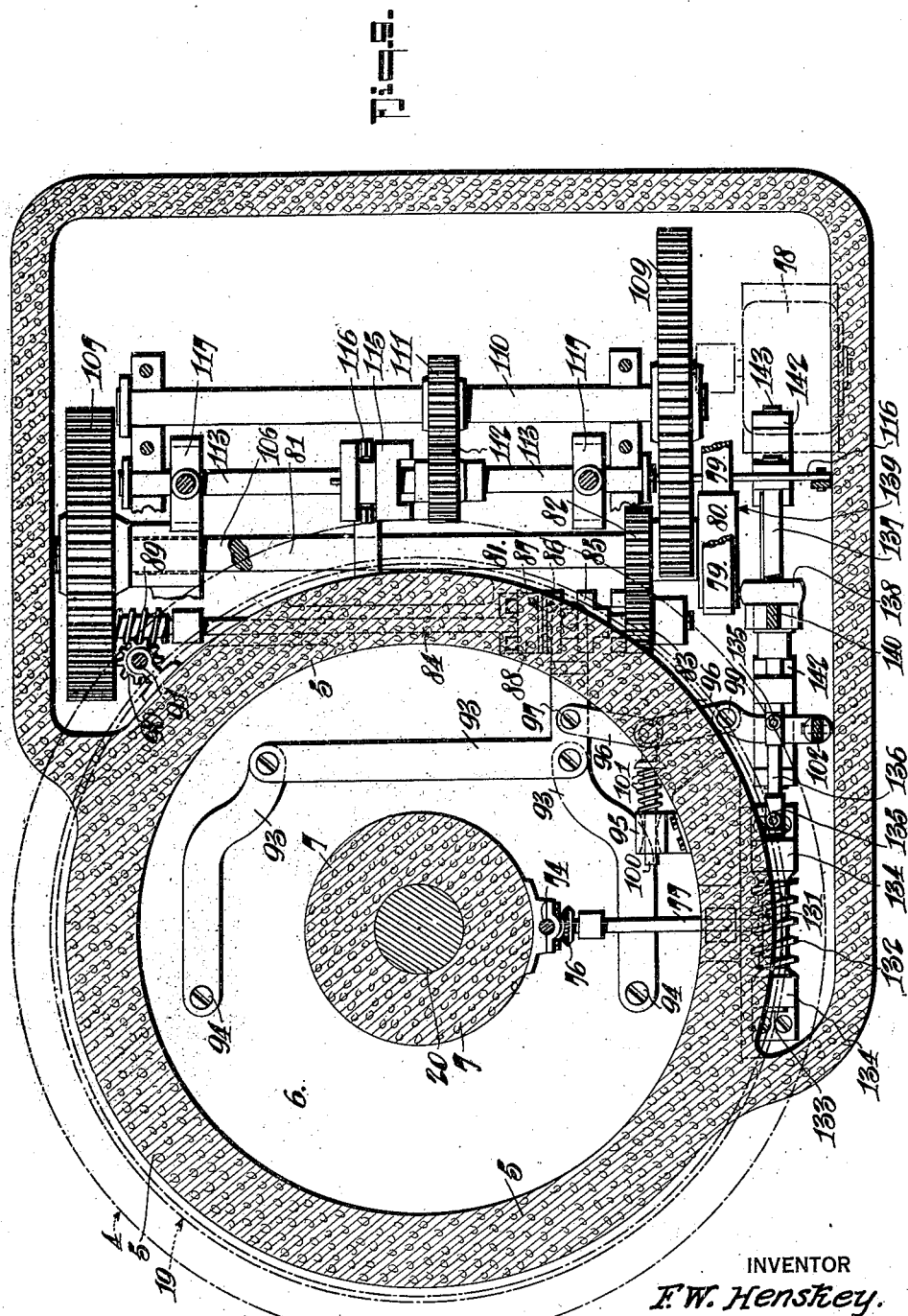
Figure 9 is a horizontal sectional view taken through the lower part of the masonry base and clearly illustrates the power and driving mechanism.

The turn-table is provided with a rectangular opening for the folding plates 27 and 28 and the feed rollers 65, as best shown in Figure 5.

The channel irons 12 and 18 also support the centrally located bearing edge bar or rest 17 for the adjacent ends of the folding plates 27 and 28.

The ring 11 has an external gear 19 by means of which the table is turned through the action of mechanism later described.

Loose on the post 20 is a spur gear 22, while a bevelled gear 23 is fastened immovably to the post, as at 24, and it is between these gears 22 and 23 that the casting 13 has bearing.

The casting 13 also supports two sets of vertical guides 25 on its extensions 26, in which guides the slides 51 and 54, hereinafter again referred to, operate.

There are two folding plates 27 and 28 provided, each separate from the other but cooperating book fashion to fold together and thereby fold or bend over the sheet or sheets of the material being worked on between them.

These plates have cut out portions 29 in which the feed rollers 65 lie when the plates are lying flat in their inoperative position.

The plates, when lying flat, are sustained by having their lugs 50 arranged to rest on supports of the table frame to keep the center of the plates from rising when the breakers are released.

The plates 27 and 28 also have central bearing lugs 30 and side lugs 31, the latter depending from the plates proper for a purpose later understood.

The plate 27 has T-slots 32 for the stops 33 which are adjustably held in place by clamps 34. The opposite plate 28 has correspondingly located recesses 35 to receive the stops 33, when the plates 27 and 28 are folded together.

The plate 28 also has T-slots 32 for the adjustable stops 33, and the plate 27 has recesses 35 to receive the stops 33 of the plate 28, when the plates are folded together.

The plate 27 is also provided with T-slots 36 for the fingers 37 of the gripping slide plate 38, each of which has a series of holes 46 for the pack engaging lugs or pins 39, by means of which different width stock can be clamped to the table.

40 designates a locking slide bar mounted in guides 43 and having cams 41 to engage abutments 42 on the finger plate 38, it also having a shoulder 44 to receive blows from a sledge or hammer to force the locking slide home.

There is a releasing abutment 45 provided which engages a cam 144 on the platform, as the table rotates, to release or unlock the pack gripper slide plate 38 at the proper time and place. 49 is a butt piece to hold the locking bar 40 against the plate 27.

The bending or folding plate 28 has recesses 47 and 48 for the parts 39, 41, 42, 43, 49, etc., when the plates 27 and 28 are folded together.

The wings 31 of the bending plates are connected with the slide blocks 51 by rods 52, the slide blocks 51 being raised, to elevate the folding plates, by the upward movement of the slide 54, the latter being worked by pitmen 55 connected to cranks on the back of the travelling bevelled gears 53, the latter meshing with the fixed gear 23.

The gears 53 are carried on a shaft 56 which is mounted in suitable projections of the casting 13.

The breakers 57 are pivoted between ears 58 and are operated by means of yoke levers 59 fulcrumed to the casting 13 at 60 and connected with the breakers by rods 63, the yoke levers 59 have rollers 61 which run in channeled cam tracks 62. The rods 63 project through slotted channel iron braces 64, as shown.

The feed rollers' shafts 66 and the countershafts 67 are mounted in relatively fixed locations on the table and do not go up with the folding plates. The feed rollers are driven from the countershafts 67 by beveled gears 68. Bearing brackets 69 are provided for the countershafts 67.

The countershafts 67 are driven from vertical shafts 70, mounted in bearings 71 in the casting 13, through beveled gears 72, they being in turn driven through gears 73 meshing with the loose gear 22 and driven by a vertical shaft 74 and gears 75 and 76 from the drive shaft 77.

Power to operate the several parts of the mechanism may be derived from an electric motor 78 mounted at the ground level and having its power transmitted through a belt 79 and pulley 80 to a shaft 81 on which is a gear 82 that meshes with a clutch faced gear 83 running loose on the shaft 84. The shaft 84 has a sliding clutch-brake 85 adapted to engage the clutch face of the gear 83 or to have its brake surface 86 brought into contact with the brake surface 87 fixed to a bearing bracket 88, as the case may be. The clutch-brake 85 is moved by a frame 93, pivoted at 94 and connected at 97 to one link 96 which is pivoted at 98 to another link 96 that is pivoted at a fixed place 99.

A rod 100 slides in a bearing 95 and has a shouldered head pivoted at 98 to the links 96 and has a spring 101 for forcing the links toward longitudinal alignment to thereby release the clutch-brake 85 from the clutch-gear 83 and apply the brake at 86—87. A lever 102 is provided to move the links 96 against the force of the spring 101 and the platform 1 is notched at 103 to hold the lever 102 with the clutch-brake 85 engaging 83 until released at the proper times by one or the other of the cams 104 on the turn-table.

The shaft 84 has a worm 89 which meshes with a worm gear 90 on the vertical shaft 91 whose gear 92 meshes with the ring gear 19.

The shaft 81 has a pinion 105 which meshes with a gear 107 on a countershaft 106 that has a pinion 108 to mesh with a gear 109 on a shaft 110 which in turn carries a pinion 111 which meshes with a pinion 112 on the shaft 113 that is provided with a loose gear-clutch member 114 and a sliding clutch 115. The clutch 115 is of the well known single-revolution-release type, i. e. it automatically throws out after making one revolution, and as the construction thereof per se forms no part of my invention, a detailed description and disclosure thereof is unnecessary.

The clutch 115 is thrown in by a lever mechanism 116.

The shaft 113 is provided with eccentrics 117 which through their rods work guillotine knives 118 of the cutting or trimming mechanism. Rollers 119 are provided for the arcuate wings 31 of the folding plates which bear against them in raising and lowering and thereby serve to constitute lateral bearings therefor when in the operation of folding the tin pack.

In order to center the sheet or pack on the table in proper position to be folded so as to facilitate cutting only a minimum wastage, I provide a centering gauge consisting of a housing 120 adapted to be clamped removably onto the platform (preferably flush with the same) which encases racks 121 having arms 122 that carry fingers 124 and 125 and have rollers 123 to ride on the top of the platform.

The finger 124 rests in contact with the platform, while the finger 125 is elevated enough so that the sheets or packs will pass under the same. The housing 120 is clamped in place by suitable clamps 129. 126 is a pinion in the housing that meshes with the racks 121 and is adapted to be turned by a removable crank 127. Slots 128 in the housing allow the posts 130 that sustain the arms on the racks to pass through.

The shaft 77 which operates the feed rollers is provided with a worm gear 131 that meshes with a worm 132 on a shaft 133 that is journaled in bearings 134 and is connected through universal joints 135 and line shaft 136 with the shaft 137 that is mounted in bearings 142 that are pivoted at 143 so that the shaft 137 may be swung bodily laterally. Slidable on but turning with the shaft 137 is a friction gear 138 that is adapted to cooperate with the friction surface 139 on the pulley 80. The friction gear 138 is slid along the shaft 137 and moved into and out of contact with the friction face 139 by a lever 140 which is mounted on a universal pivot 141. By moving the lever 140 to bring the friction gear 138 to one side or the other of the axis of the shaft 81 and moving it into contact with the friction surface 139, rotation may be imparted to the feed rollers in one direction or the other and at such speeds as depend upon the distance between the axis of the disc 139 and the friction gear 138.

Operation.

So far as described the manner in which my machine operates is as follows:

Assume the table to be in the position indicated in Figure 1, the tin pack having arrived from the mill and entered upon the table from a position at the top of Figure 1, as indicated by the arrow, the tin plate pack being fed against the arm 124 of the centering gauge by the feed rollers 65 controlled through the action of lever 140, the operator, after inserting the crank 127, turns the same until the finger 125 lies over the scrap end of the pack just clear of the scrap (i. e. along a line tangent to the concavity, when the scrap end is concaved, or along the chord of the arc of the convexed end of the pack when the scrap end is full, see Figure 1) thereby bringing the center of the pack at the bending line of the table as well as endwise lining up the plates of the pack.

The attendant then moves slide 40 to the locking position, hitting the shoulder 44 with a hammer to lock the studs 39 against the sheet pack and thereby forcing it against the fixed stops 33 and clamping it firmly in place on the folding or bending plate 27. Thus the pack of sheets is edged and the sheets held in perfect alignment with no possible chance of spreading the sheets or pack, an important matter in the manufacture of tin plate. The sheets are "locked" to the plate 27 during the complete doubling operation.

Figure 2:
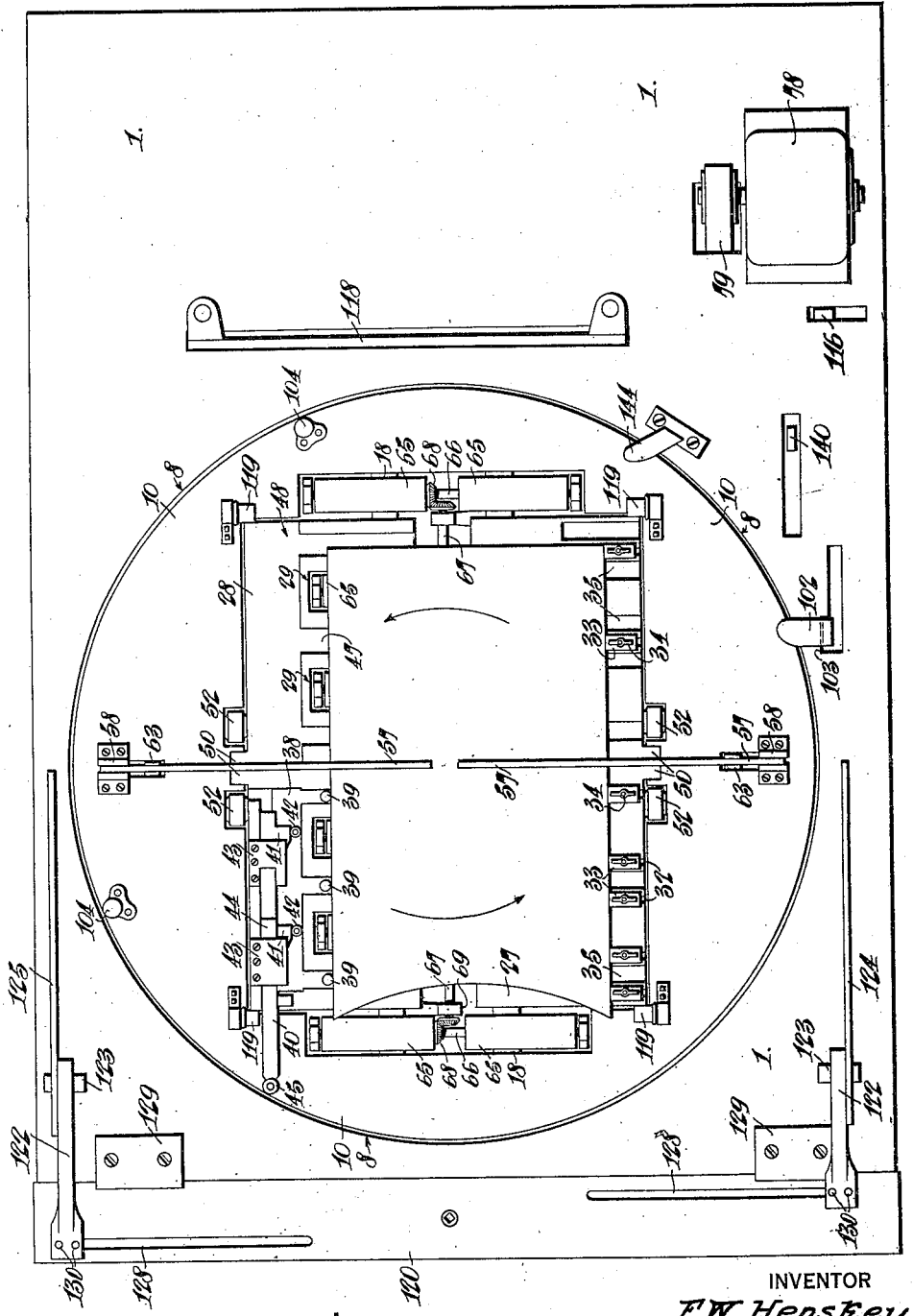
Figure 2 is a top plan view showing the table turned one-quarter revolution.

The attendant next moves lever 102 to engage notch 103 in the platform and thereby brings clutch 85 into connection with the clutch-gear 83. This sets shaft 84 in motion to turn the table. As the table turns through about the first quarter revolution, the breakers 57 will be brought down from their substantially elevated position, at which they stood when the table started to move, and into alignment across the pack and press firmly against it at the line of bend. This is done by the quick acting portions of the track cams 62 pressing down yoke levers 59. At this time, the table will have assumed the position shown in Figure 2 and the crank gears 53 will have caused the connecting rods or pitmen 55 to have brought the slides 54 up into contact with the slide 51.

Figure 3:
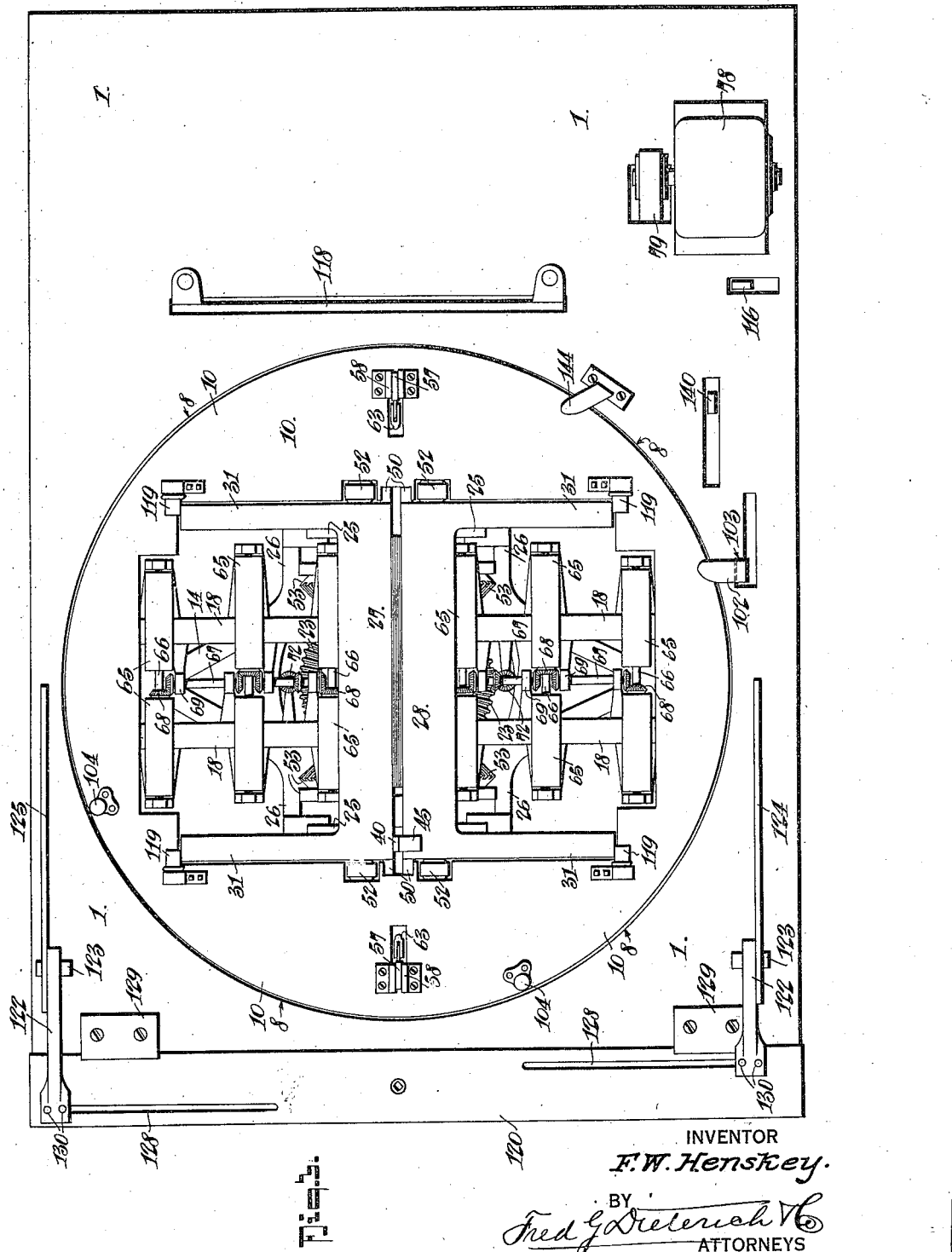
Figure 3 is a top plan view showing the table turned one-half revolution.
Figure 4:
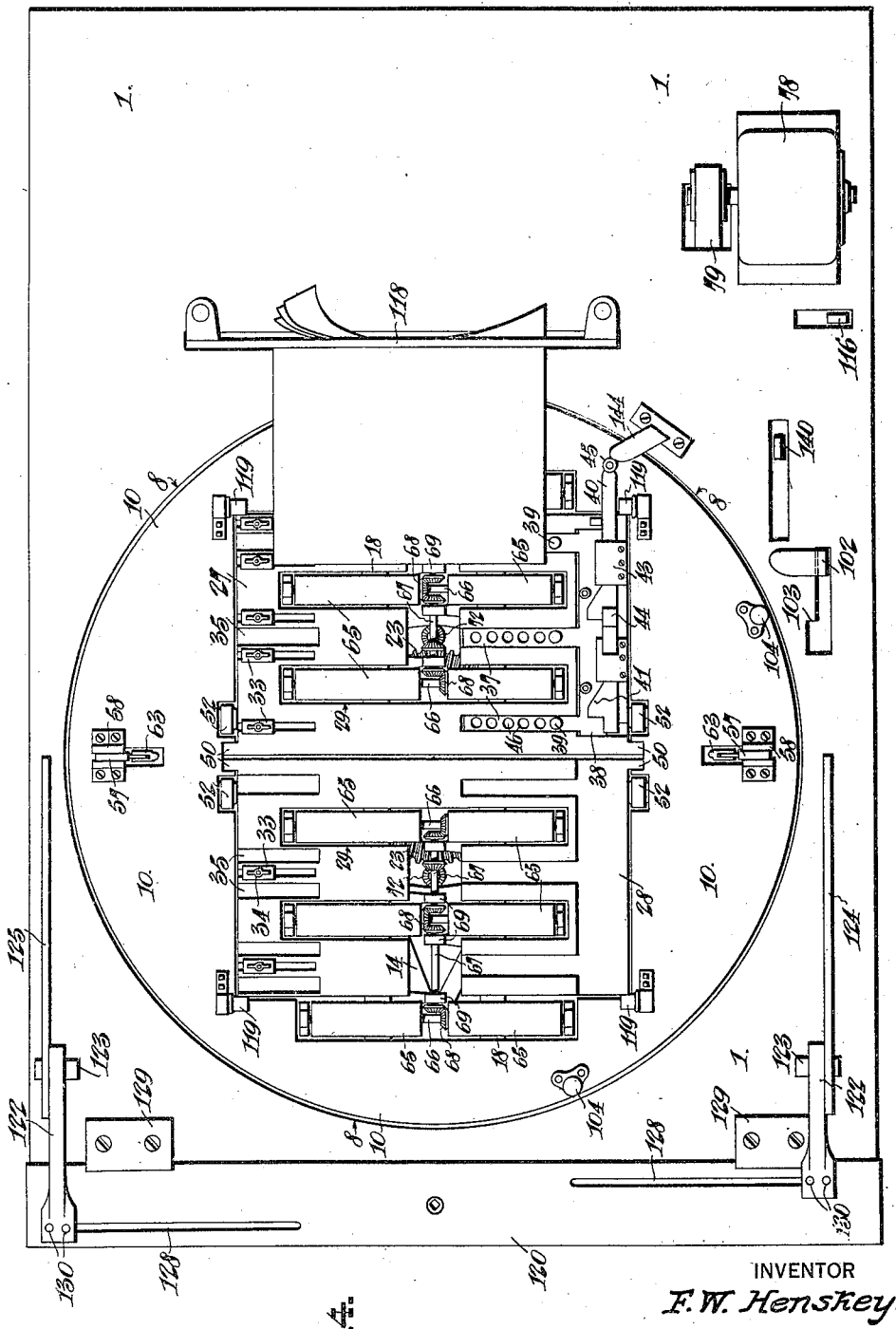
Figure 4 is a top plan view showing the table turned to, and automatically stopped at, the three-quarters revolution.

Continued rotation of the table causes the slides 54 to lift the slides 51, thereby elevating the bending plates 27 and 28 to the vertical position by the time the table has made another quarter turn, i. e. one-half revolution from the starting place (see Figure 3). As soon as the plates 27 and 28 are raised to about an angle of sixty degrees, the breakers 57 are raised and assume their normal or vertical position about the time the table has made approximately one-half a revolution from the starting point, in which position they remain until the table has made about seven-eighths of a revolution when they start down again to grip the next pack as the next revolution of the table begins in the manner above described.

On turning from the half revolution position toward the three-quarters revolution position (it being understood that the table moves continuously from the start to the three-quarter position) the bending plates are opened and restored flush with the table top. Just before this is done, i. e. just before the completion of the three-quarter turn of the table, the fixed cam 144 is engaged by the roller-abutment 45 and the locking bar 40 is released to free the grippers from the pack and leave the pack free for further manipulation.

As the table approaches the three-quarters turn position, the first one of the cams 104 on the table will engage lever 102 and release it, thereby allowing spring 101 to act and throw out clutch 85 and apply the brakes 86—87 to stop the turn-table.

The pack is now ready to be fed to the shears and this is accomplished by the operator throwing friction gear 138 into proper position against friction disk 139 to set the feed rollers 65 into motion. As the shears are located at the "three-quarter station", the folded pack will be in such position as to present the scrap end to the shears without further turning of the pack. After positioning the pack to the shears, the attendant manipulates lever 116 to throw in clutch 115 which makes one revolution, thereby lowering the guillotine knife 118 to cut off the scrap and again raising it. The attendant then reverses the operation of the feed rollers and runs the pack off the table curled end toward the heater. After this, the clutch 85 is again thrown in by pushing the lever 102 forward into the notch 103 and the table completes its revolution, being brought to a stop at the end of the said revolution by the releasing of the lever 102 through engagement of it by the second fixed cam 104, thus completing one cycle of operation.

From the foregoing, it will be seen that I have provided a machine which is substantially automatic in action; one which will handle the sheets in the most advantageous manner; one in which provision is made for centering the same amount of good iron on each bending plate leaving only the scrap at one end projecting to be trimmed off; one in which the location of the doubled pack will always be on the same bending plate with the scrap end presented to the shears and the curled end toward the heater (i. e. will discharge in the direction of the horizontal arrow in Figure 5); one in which the table is stopped automatically, hence always at the proper place; one in which handling of the pack at any time from the time it enters the machine until it leaves the same ready for the heater, is avoided; and one in which the breakers are operated by sure and powerful means, their being no possible danger of the breakers becoming wedged between the folding plates because their operation is controlled by the revolving table, therefore the breakers recede with the same speed as the bending plates close.

While I have shown a preferred embodiment of the invention in the accompanying drawings, nevertheless I desire it understood that I do not limit myself thereto but changes in the details of construction and arrangement of the parts may be made without departing from the spirit of the invention or the scope of the appended claims.

What I claim is:

1. In a machine of the class described, a rotating table, means for turning the same, means for conveying tin sheets across the table, sheet bending plates carried by the table, means for edging and clamping the sheets on one of the bending plates, breakers for holding the sheets down along the line of bend, means for operating the breakers, means for operating the sheet bending plates and means for releasing said edging and clamping means from the sheets after they have been doubled.

2. In a machine of the character described, a rotating table, means for turning the same, means for travelling the sheets to be folded across the table, means for positioning the sheets on the table, sheet folding plates carried by the table, means for edging and clamping the sheets to one of said plates, means operating on the commencement of rotation of the table for applying said edging and clamping means, breakers for holding the sheets down along the line of bend, means operating on further rotation of the table for applying said breakers to the sheets, means operating on still further rotation of the table for doubling the sheets, means for withdrawing said breakers from the sheets before they are completely doubled, and means for releasing said edging and clamping means from the sheets after the sheets are doubled.

3. A rotating table, sheet conveying means for placing sheets on and removing them from said table, folding plates carried by said table for doubling the sheets, clamps holding the sheets in place on the folding plates, breakers for holding the sheets down at the line of bend as said folding plates begin their folding act, and means for operating the aforesaid parts in orderly fashion during each rotation of the table.

4. In apparatus of the class described, a rotating table, sheet conveyors for delivering the sheets onto and removing them from said table, sheet folding plates carried by said table, means for holding the sheets in place on said folding plates, breakers for holding the sheets down at the line of bend, means governed by the rotation of the table for operating said sheet folding plates and said breakers, and means for effecting rotation of the table.

5. In apparatus of the class described, a rotating table, sheet conveyors for delivering the sheets onto and removing them from said table, sheet folding plates carried by said table, means for holding the sheets in place on said folding plates, breakers for holding the sheets down at the line of bend, means governed by the rotation of the table for operating said sheet folding plates and said breakers, means for effecting rotation of the table, said sheet folding means including edging clamps, and means governed by the rotation of the table for releasing said edging clamps after the sheets have been folded.

6. In a machine of the class described, a rotating table, means for imparting unidirectional rotation to said table, sheet feeding means, manually controlled power applying devices for operating said sheet feeding means, sheet clamping means, sheet folding means including hinged folding plates and breakers, means governed by the rotation of said table for operating said folding plates and breakers, means governed by the rotation of the table for releasing said sheet clamping means after the sheet has been folded.

7. In a machine of the class described, a rotatable table, power applying mechanism for imparting rotation thereto, sheet folders and clamps on the table, and means operating during each rotation of the table for actuating said folders and releasing said clamps.

8. In a machine of the class described, a rotatable table, power applying mechanism for imparting rotation to said table, a manually controlled means for starting rotation of the table, and means co-operative therewith and governed by the rotation of the table for stopping the rotation of the table at intervals, sheet folding plates and breakers carried by the table and means for operating said folding plates and breakers governed by the rotation of the table.

9. In a machine of the class described, a rotating table, means for effecting rotation of the same, sheet feeding rollers on the table, sheet centering elements, sheet slide clamps, means for locking and unlocking said slide clamps, sheet breakers, means for lowering and raising said breakers at intervals, said means being governed by the rotation of the table, sheet bending plates, and means governed by the rotation of the table for actuating said bending plates at intervals.

10. In a machine of the class described, a rotating table, means for effecting rotation of the same, sheet feeding rollers on the table, sheet centering elements, sheet slide clamps, means for locking and unlocking said slide clamps, sheet breakers, means for lowering and raising said breakers at intervals, said means being governed by the rotation of the table, sheet bending plates, means governed by the rotation of the table for actuating said bending plates at intervals, shears adjacent to the table to which the pack is fed by said feeding rollers, and means to operate said shears.

11. In a machine of the class described, a rotating table, means to rotate said table, means for stopping the rotation of said table after it has progressed three-quarters of a revolution and again at the end of a full revolution, means for starting the rotations of the table, sheet feeding elements on the table, sheet centering, sheet edging and sheet clamping means on the table, manual controls for said feeding, centering edging and clamping means, and mechanically actuated means operated at the end of the three-quarter turn of the table to release said edging and clamping means, and means for folding the sheets during the first three-quarter turn of the table.

12. In a machne of the class described, a rotating table, means to rotate said table, means for stopping the rotation of said table after it has progressed three-quarters of a revolution and again at the end of a full revolution, means for starting the rotations of the table, sheet feeding elements on the table, sheet centering, sheet edging and sheet clamping means on the table, manual controls for said feeding, centering, edging and clamping means, and mechanically actuated means operated at the end of the three-quarters turn of the table to release said edging and clamping means, means for folding the sheets during the first three-quarter turn of the table, and means operative at the first stop of the table for trimming said sheets.

13. In a machine of the class described, a rotatable table, a pit in which said table rotates, a mechanism in the pit for rotating said table, a platform sustained above the pit and having an opening in which the table top turns, sheet passing rollers carried by the table, means in the pit for actuating said rollers, sheet bending plates and breakers carried by the table, and means governed by the rotation of the table and located in the pit for operating said breakers and sheet bending plates.

14. In a machine of the class described, the combination with a fixed platform a rotatable table having bending plates on which the sheets are received, of a sheet centering device mounted on said platform and co-operating with said table for locating the place of bend of the sheets at the bending line between the bending plates.

15. In a machine of the class described, the combination with a rotatable table having bending plates on which the sheets are received, of a sheet centering device for locating the place of bend of the sheets at the bending line between the bending plates, and sheet edging and clamping members on the bending plates for holding the centered sheets.

16. In a machine of the class described, the combination with a table, of a sheet centering device comprising a pair of parallel fingers, one in close proximity to the plane of the table top and the other elevated above the same, means to locate said fingers equidistant from and at opposite sides of the center line of the table, means to cause said fingers to approach or recede from one another with equal velocity to thereby center the sheet.

17. In combination with the platform and the table top, a sheet centering device located on the table top including a housing, rack bars and a pinion cooperating therewith in the housing, arms connected to said bars, rollers sustaining said arms on the platform, fingers carried by said arms to project over the table top and a crank for turning said pinion.

18. In combination with the platform and the table top, a sheet centering device located on the table top including a housing, rack bars and a pinion cooperating therewith in the housing, arms connected to said bars, rollers sustaining said arms on the platform, fingers carried by said arms to project over the table top and a crank for turning said pinion, one of said fingers lying close to the table top to raise a sheet thereon, the other of said fingers being elevated above the sheets for the purposes specified.

19. In a machine of the class described, a sheet centering device comprising in combination with the stationary platform and the rotatable table top and the bending plates thereon, said bending plates adapted to fold along a center line; said sheet centering device comprising a pair of fingers mounted on the stationary platform projecting over the table top, said fingers being located equi-distantly from the central line of the bending plates, and means for moving said fingers toward or from each other with equal velocity, one of said fingers being in proximity to the table top to be engaged by a sheet thereon, the other of said fingers being elevated to pass above the sheet substantially as shown and for the purposes described.

20. In combination with the platform and the rotating table top carrying the bending plates of a machine of the class described; a housing secured to the table top, rack bars in the housing, a pinion engaging said rack bars for moving them endwise in opposite directions with velocity, arms carried by the respective rack bars, said housing lying along said platform parallel to the direction at which a sheet enters onto the table, fingers carried by said arms projecting across the table and platform in a direction at rightangles to that at which the sheet enters onto the table, the finger adjacent to the entrant end of the table being elevated to permit the sheet to pass under the same and the finger adjacent to the end of the table opposite the entrant end lying in close proximity to the table to arrest the on-coming sheet and a device for turning said pinion to move said rack bars to move said fingers and thereby center a sheet on the folding plates of the table to determine the line at which the sheet is to be bent.

21. In a machine of the class described, a rotatable table having a top provided with an opening, bending plates lying in said opening, sheet passing rollers lying in said opening and mounted independently of said bending plates, said bending plates having openings to receive said rollers, means to turn said table, means to raise and lower said bending plates and means to operate said rollers.

22. In a machine of the class described, a rotatable table having a top provided with an opening, bending plates lying in said opening, sheet passing rollers lying in said opening and mounted independently of said bending plates, said bending plates having openings to receive said rollers, means to turn said table, means to raise and lower said bending plates, means to operate said rollers, said bending plates having arcuate wings, and rollers on the table against which said wings bear as the plates are raised and lowered.

23. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, plate bending mechanism mounted on said table and means to operate said mechanism and said table.

24. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, bending plates sustained on said table, and means for raising and lowering said plates as the table turns.

25. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, bending plates sustained on said table, means for raising and lowering said plates as the table turns, said means including slideways carried by said framework, slides in said slideways operatively connected with said bending plates and means operated by the rotation of said table to raise and lower said slides.

26. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, bending plates sustained on said table, means for raising and lowering said plates as the table turns, said means including slideways carried by said framework, slides in said slideways operatively connected with said bending plates, a fixed gear on said post, travelling crank-gears carried by said table and engaging said fixed gear and pitman connecting said crank gears with said slides.

27. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, bending plates sustained on said table, means for raising and lowering said plates as the table turns, breakers pivoted to the table top and means operative on rotation of the table for actuating said breakers.

28. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, bending plates sustained on said table, means for raising and lowering said plates as the table turns, said means including slideways carried by said framework, slides in said slideways operatively connected with said bending plates, means operated by the rotation of said table to raise and lower said slides, breakers pivoted to the table top and means operative on rotation of the table for actuating said breakers.

29. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, bending plates sustained on said table, means for raising and lowering said plates as the table turns, said means including slideways carried by said framework, slides in said slideways operatively connected with said bending plates, a fixed gear on said post, travelling crank-gears carried by said table and engaging said fixed gear and pitmen connecting said crank gear with said slides, breakers pivoted to the table top and means operative on rotation of the table for actuating said breakers.

30. In a machine of the class described, a pit, a platform above the pit having an opening, a table including a framework and a top, the latter lying in said opening and the framework being located in said pit, a circular track in said pit, wheels on said framework for sustaining the table on said track, a center post, said framework including a bearing on said center post, means to turn said table, bending plates sustained on said table, means for raising and lowering said plates as the table turns, breakers, breaker operating means, said breaker operating means comprising levers carried by said table and connected with said breakers, and track cams in said pit for moving said levers as the table turns.

31. In a machine of the class described, a rotating table, sheet passing rollers carried by the table, means for turning said rollers in either direction, said means including a post, a loose gear on the post, shaft and gear connections between said loose gear and said rollers, and power applying means including shafts and gears for turning said loose gear irrespective of the position of the table.

32. In a machine of the class described, a rotating table, sheet passing rollers carried by the table, means for turning said rollers in either direction, said means including a post, a loose gear on the post, shaft and gear connections between said loose gear and said rollers, and power applying means including a motor, a driving friction disk operated thereby, a line of shafting and gear connections with said loose gear, a friction gear on said line of shafting and operator controlled means for holding said friction gear in contact with said friction disk.

33. In a machine of the class described, a uni-directional rotatable table, sheet bending mechanism mounted on said table, power applying means to rotate said table and including a continuously rotating shaft, another shaft with clutch and brake devices to connect it with said rotating shaft or to stop its rotation, means controlling said clutch and brake devices, a driving connection between said other shaft and the table and means operating said bending mechanism.

34. In a machine of the class described, a rotatable table, power applying means to rotate said table and including a continuously rotating shaft, another shaft with clutch and brake devices to connect it with said rotating shaft or to stop its rotation, means controlling said clutch and brake devices, a driving connection between said other shaft and the table, the said brake and clutch devices' controlling means including devices continually tending to apply the brake and disengage the clutch, and a lever for applying the clutch and releasing the brake.

35. In a machine of the class described, a rotatable table, power applying means to rotate said table and including a continuously rotating shaft, another shaft, with clutch and brake devices to connect it with said rotating shaft or to stop its rotation, means controlling said clutch and brake devices, a driving connection between said other shaft and the table, the said brake and clutch devices' controlling means including devices continually tending to apply the brake and disengage the clutch, a lever for applying the clutch and releasing the brake, means to hold said lever in the clutching position and means governed by the rotation of the table for releasing said lever at times.

36. In a machine of the character described, a pair of sheet bending plates adapted to be folded together book fashion, one of said plates having a set of relatively fixed edging clamps and a set of slidable edging clamps and means for forcing said slidable clamps into engagement with the sheet and locking the same.

37. In a machine of the character described, a pair of sheet bending plates adapted to be folded together book fashion, one of said plates having a set of relatively fixed edging clamps and a set of slidable edging clamps, means for forcing said slidable clamps into engagement with the sheet and locking the same, the other plate having recesses to receive said edging clamps and locking means when the plates are folded together.

38. In a machine of the class described, a pair of foldable bending plates, one of which is provided with a set of T-slots, adjustable edging clamps in said slots with means for holding said clamps relatively fixed, said plates also having another set of slots, a plate having arms located in said slots, edge clamps on said arms and a locking slide cooperating with said arm carrying plate to lock the same in the clamping position.

39. In a machine of the class described, a table having a fixed part, sheet bending plates on the table adapted to close up book fashion, said plates each comprising a top and side wings, said top having under portions adapted to rest on said fixed part of the table when the plates are normal, and guide rollers on the table against which said wings bear as the plates fold up and open out.

40. In apparatus of the class described, a rotatable table, means for turning the same, sheet feeding means, sheet clamping means, sheet folding means including hinged bending plates and breakers, means operating during each rotation of the table for actuating said folding means and means for subsequently releasing said sheet clamping means.

41. In a machine of the class described, a rotatable table, means for effecting rotation of the table, sheet locating devices for positioning sheets on the table, sheet edging clamps, breakers for holding the sheets at the line of bend, sheet bending plates, means operating during each rotation of the table for operating said breakers and means operating during each rotation of the table for operating said bending plates.

42. In a machine of the class described, a rotatable table, means for rotating it, sheet locating devices for positioning the sheets as they arrive on the table, sheet feeding means on the table for moving the sheets on the same, sheet edging clamps, breakers for holding the sheet at the line of bend, sheet bending plates, means for operating said edging clamps to clamp the sheets and several means governed by the rotation of the table for first bringing said breakers into place on the sheets, then commencing the operation of the bending plates, withdrawing said breakers before the operation of said bending plates has been completed and finally releasing said sheet edging clamps.

FREDERICK WILLIAM HENSKEY.